Figure 1:
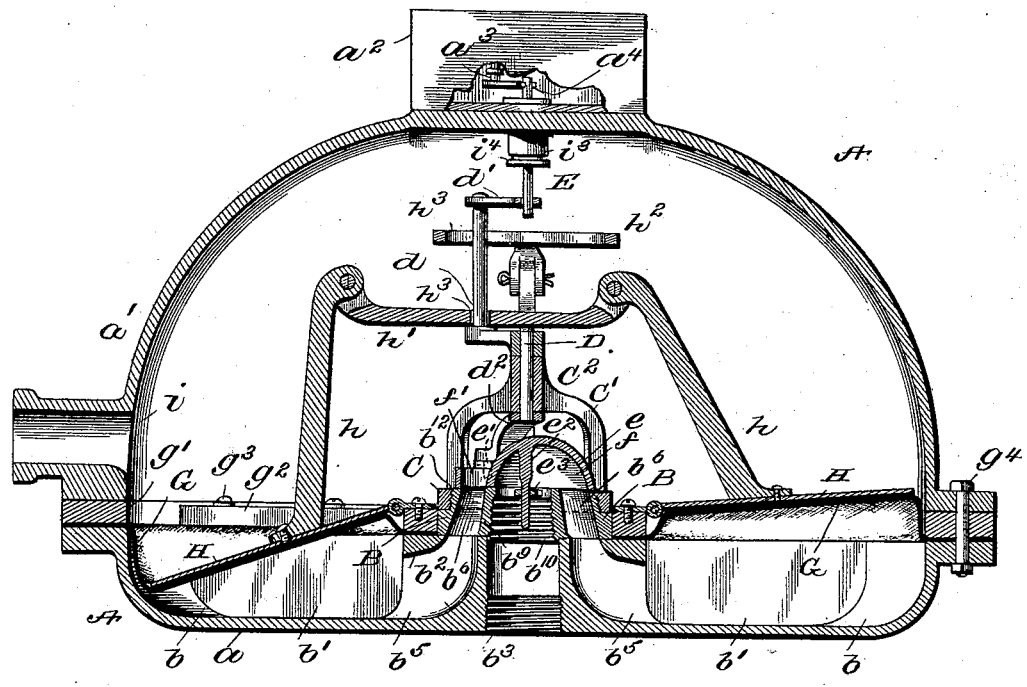

(No Model.) 4 Sheets—Sheet 1.

O. C. PUDAN & L. B. FULTON.
GAS METER.

No. 523,291. Patented July 17, 1894.

Witnesses

Inventors
Oliver C. Pudan,
Louis B. Fulton,
Attorney (No Model.) 4 Sheets—Sheet 2.

O. C. PUDAN & L. B. FULTON.
GAS METER.

No. 523,291. Patented July 17, 1894.

Witnesses
Inventors
Attorney (No Model.) 4 Sheets—Sheet 3.

O. C. PUDAN & L. B. FULTON.
GAS METER.

No. 523,291. Patented July 17, 1894.

Witnesses

Inventors
Oliver C. Pudan,
Louis B. Fulton,
By their Attorney (No Model.) 4 Sheets—Sheet 4.

O. C. PUDAN & L. B. FULTON.
GAS METER.

No. 523,291. Patented July 17, 1894.

Witnesses

Inventors

Attorney

United States Patent Office.

OLIVER C. PUDAN AND LOUIS B. FULTON, OF PITTSBURG, PENNSYLVANIA, ASSIGNORS TO THE CHAPLIN-FULTON MANUFACTURING COMPANY, OF SAME PLACE.

GAS-METER.

SPECIFICATION forming part of Letters Patent No. 523,291, dated July 17, 1894.

Application filed January 18, 1894. Serial No. 497,235. (No model.)

*To all whom it may concern:*

Be it known that we, OLIVER C. PUDAN and LOUIS B. FULTON, of Pittsburg, in the county of Allegheny and State of Pennsylvania, have invented certain new and useful Improvements in Gas-Meters; and we do hereby declare the following to be a full, clear, and exact description of the invention, such as will enable others skilled in the art to which it appertains to make and use the same.

This invention relates to gas-meters and has for its object, primarily, the production of a gas-meter which can be operated in one direction only, thereby insuring the proper registering of all gas consumed and rendering it impossible to reversely operate the registering mechanism by the gas-supply.

A further object is to provide a gas-meter in which friction is reduced to a minimum and the operation of the parts is aided by gravity.

A further object is to lessen the cost of manufacture, simplify the construction of the meter and render the same durable and not likely to readily get out of order; and also to produce a meter in which access can be had to the inlet and outlet valve and its operating mechanism without disturbing the diaphragms.

Another object is to dispense with the use of stuffing boxes for the shaft which operates the registering mechanism.

The invention consists broadly of a meter having its rotary inlet and outlet valve operated by the inflation of one or more diaphragms which are disconnected from the valve operating mechanism said valve being connected to registering mechanism which it is designed to operate.

The invention further consists of a gas-meter having a plurality of gas-receiving chambers with diaphragms or flexible walls, and a series of hinged wings forming part of the valve-operating mechanism and being disconnected from said diaphragms which when inflated will bear against said wings and effect the operation of the valve.

The invention further consists of a gas-meter having a series of horizontal gas-chambers provided with upper flexible walls or diaphragms and a corresponding series of wings pivotally mounted and capable of being alternately moved up and down by said diaphragms, said wings forming part of the valve operating mechanism.

The invention further consists of a fluid-tight connection for preventing the leakage of gas from the meter to the registering mechanism, the same comprising two removable plugs or housings, one fitted in the other, and a shaft having a rigidly-secured horizontal portion held tight by said plugs.

The invention also comprises the details of construction, combination and arrangement of parts, substantially as hereinafter fully set forth and particularly pointed out in the claims.

Figure 3:
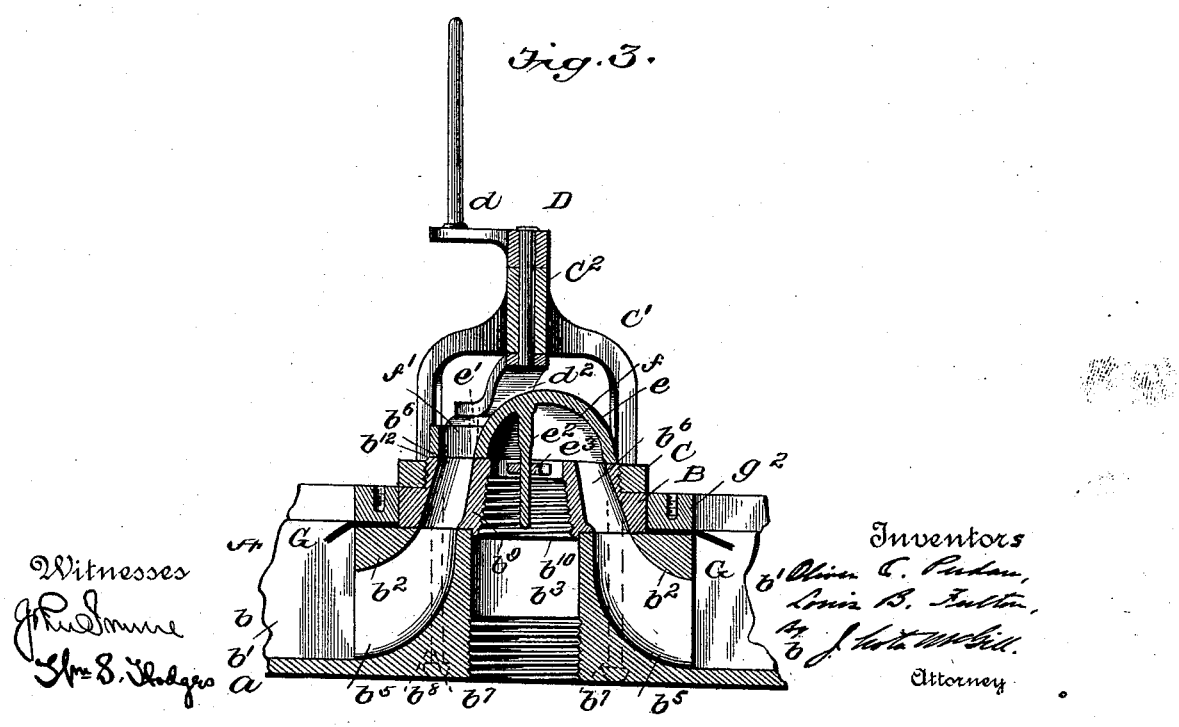
Figure 2:
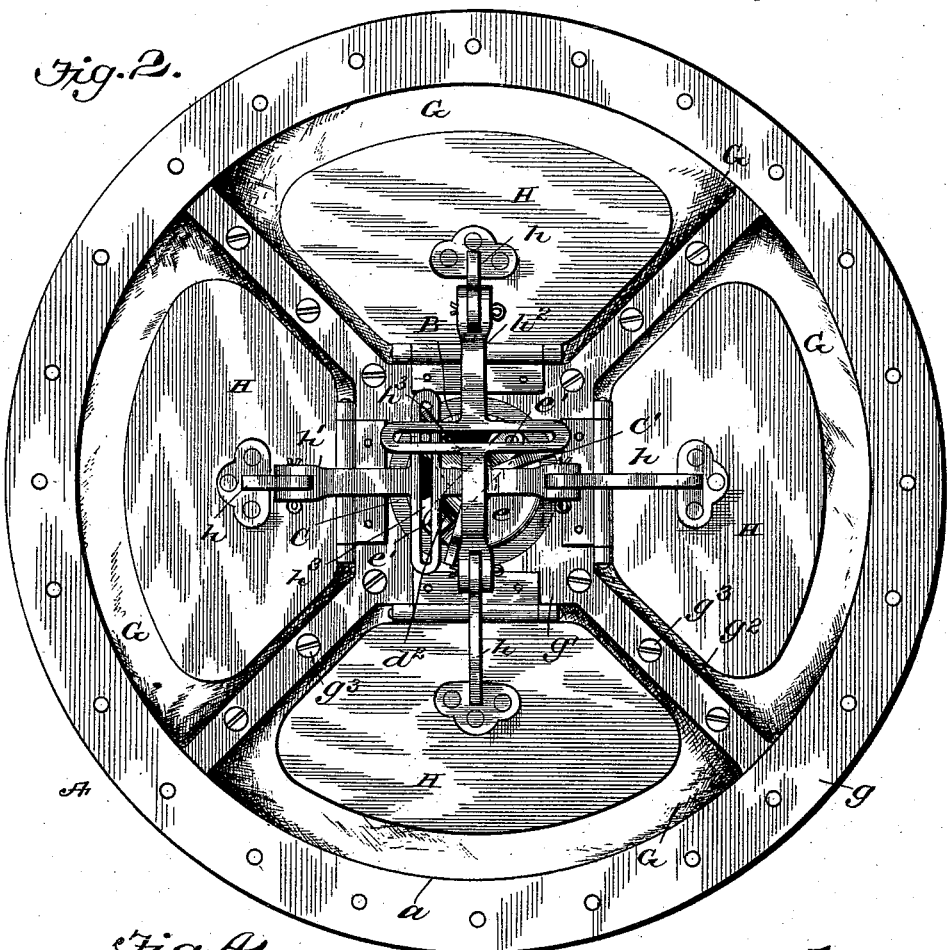
Figure 4:
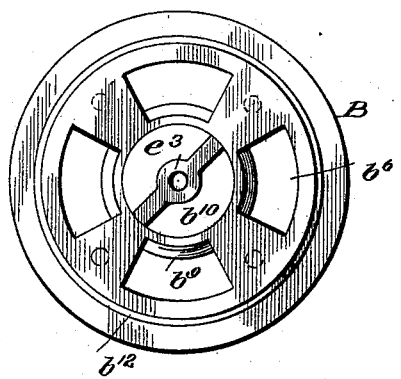
Figure 5:
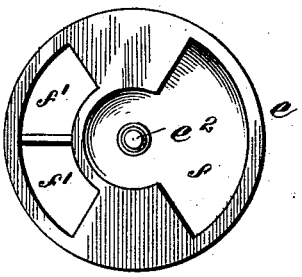
Figure 6:
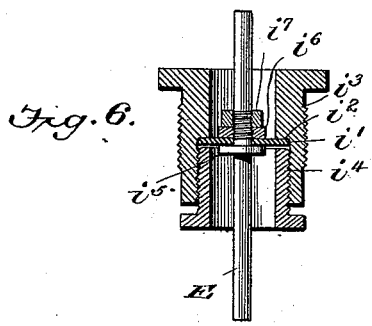
Figure 7:
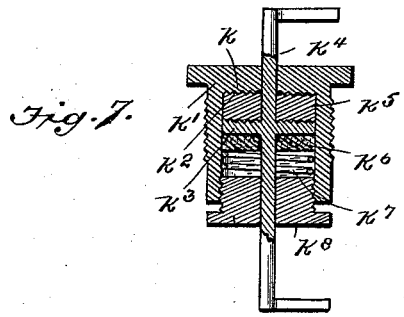
Figure 8:
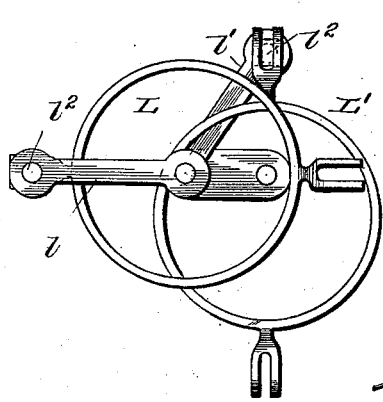
Figure 10:
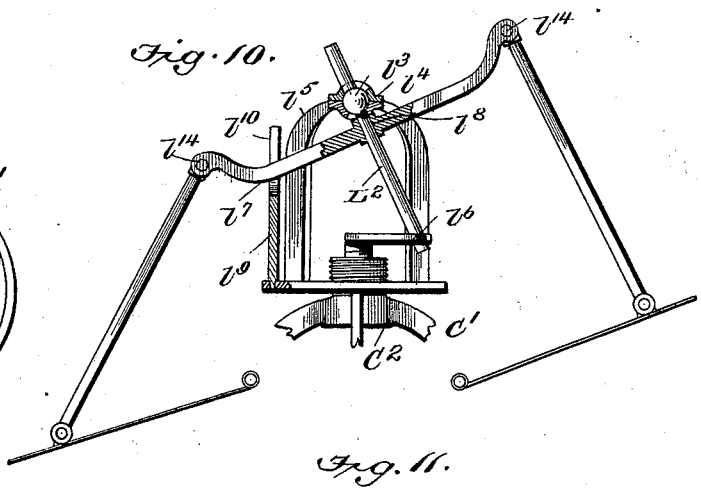
Figure 9:
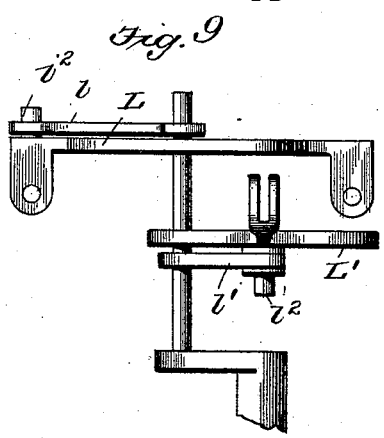
Figure 11:
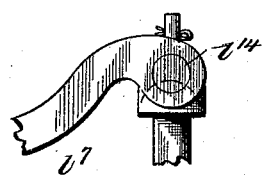
Figure 12:
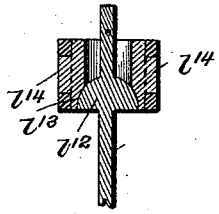
Figure 13:
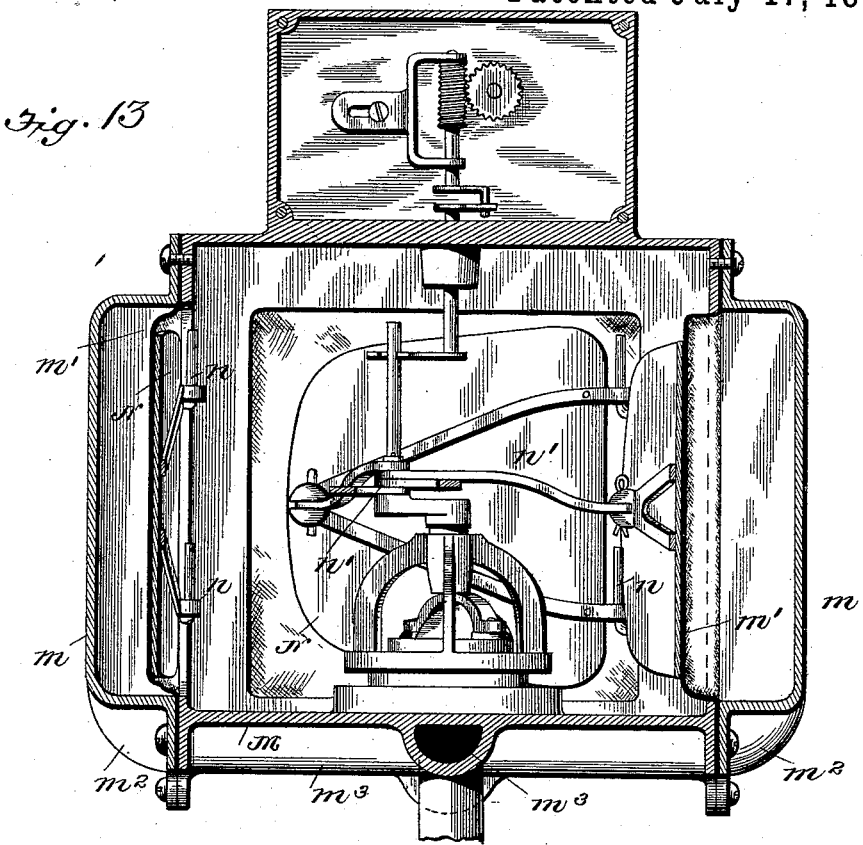
Figure 14:
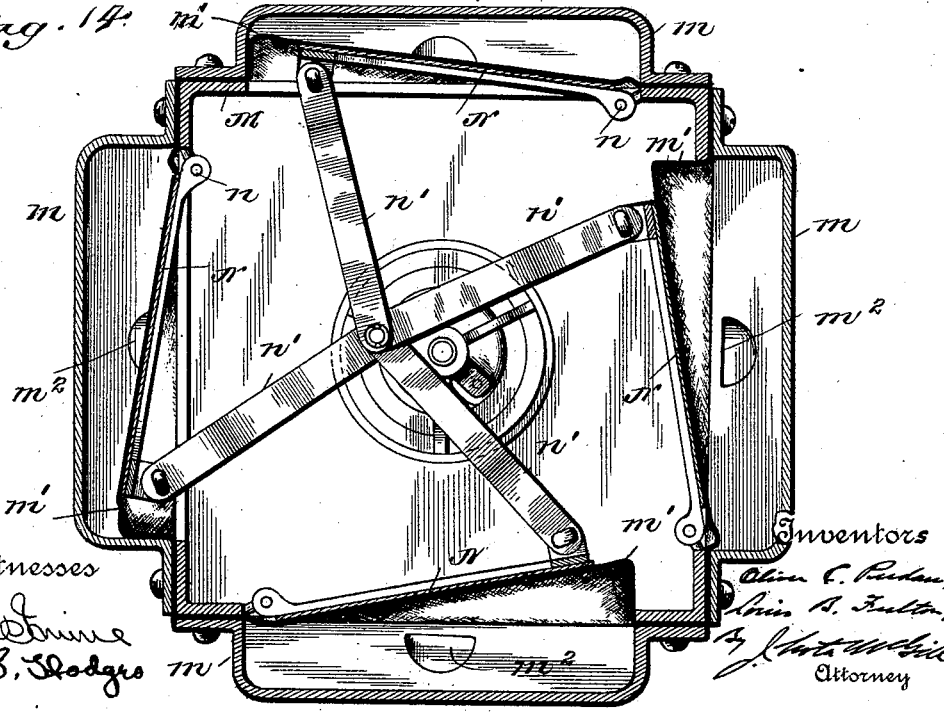

In the accompanying drawings:—Figure 1 is a vertical sectional view of our improved meter. Fig. 2 is a plan view thereof with the cover removed. Fig. 3 is an enlarged vertical sectional view of the valve and its adjuncts. Fig. 4 is a plan view of the valve seat, with the valve removed. Fig. 5 is a bottom plan view of the latter. Fig. 6 is an enlarged vertical sectional view of the register operating shaft and its adjuncts. Fig. 7 is a view of a modified form thereof. Figs. 8 and 9 are plan and side views, respectively, of slightly modified forms of valve-operating mechanism. Fig. 10 is a side view and Figs. 11 and 12 details of a second modification. Figs. 13 and 14 are, respectively, vertical and horizontal sectional views of a modified form of the meter.

Referring to the drawings, A designates the casing, of which $a$ is the bottom and $a'$ the dome-like cover, which latter has a top flattened portion on which rests the registering mechanism box $a^2$, the shaft $a^3$ of which has a right-angular slotted arm $a^4$. The bottom $a$ is divided into four separate gas-chambers $b$ by walls $b'$ which extend from a central squared portion $b^2$. In this central portion $b^2$ is a circular threaded hole or opening $b^3$. Extending from the upper surface of this central portion diagonally downward and outward are four ports $b^5$ which open into the four gas-receiving chambers, and coincident with their inner ends are the corresponding ports $b^6$ of a circular valve seat B which is held firm in position by screws $b^7$ passed upwardly through holes $b^8$ in the central portion of the bottom. A depending circular flange $b^9$ surrounding the central opening $b^{10}$ extends into opening $b^3$ and serves to additionally hold the valve-seat in place. With a reduced threaded portion $b^{12}$ of this valve-seat engages the threaded circular ring C of a cage C' from which extend three arms connected at their upper ends to a sleeve or tubular portion $C^2$. Through this sleeve is passed a valve rod D, having a crank-arm $d$, carrying a slotted arm $d'$ which engages the lower end of a librating shaft E, the upper end of the latter being in engagement with slotted arm $a^4$. To the lower end of rod D is connected a curved yoke $d^2$ which extends over the raised portion of a rotary valve $e$ and is provided with lugs $e'$ at its ends which fit in corresponding recesses in said valve. From the under side of the center of the raised portion of this valve extends a rod $e^2$ which is projected through a central hole in a cross-bar $e^3$ extended across the central opening of the valve seat, said rod serving as a guide for the valve. This valve is designed to supply gas to two of the gas-chambers simultaneously with the exhaust or discharge from the two other chambers. Hence one-half of the valve has a raised hollow portion $f$, while in the other half are two open ports $f'$. Hence gas supplied through the supply-pipe (not shown) which is screwed into the threaded opening $b^3$, will pass up into the hollow portion of the valve and down through two of the ports of the valve-seat and bottom of the casing into two of the gas-receiving chambers.

Extending horizontally over all of the gas chambers is one continuous piece of leather or other suitable material, constituting a diaphragm or flexible wall G for each gas receiving chamber, the same being firmly held in place by a horizontally disposed ring $g$ having a central square portion $g'$ and connecting arms $g^2$, the whole being a substantial counterpart of the upper portion of the bottom $a$ to the walls $b'$ of which the arms $g^2$ are secured by screws $g^3$ while the ring, proper, is held to and between the flanged edges of bottom $a$ and cover $a'$ by nutted bolts $g^4$. While it is preferable to form the diaphragms by extending and stretching one continuous piece of leather, yet it is obvious that a series of disconnected pieces will serve the same purpose. These diaphragms constitute the upper wall of each gas-chamber and when gas is admitted to the latter the diaphragm will be inflated or distended upwardly a considerable distance.

H designates four wings hinged or pivoted at their inner ends to the central portion $g'$ of ring G. Each of these wings corresponds in general outline, but is smaller than, the gas-chambers, and to such wings are connected the lower ends of arms $h$. These arms of opposite wings are connected by yokes $h'$, $h^2$ having bent or curved ends whereby said yokes are held out of contact with each other and free to operate. Each yoke has a central transverse slot $h^3$ extended in lateral right-angular elongations and through the slots of both of these yokes the upright arm of the cranked valve-rod is passed. By means of this construction the opposite wings have an alternate up and down movement and by reason of the right-angled slots of the connecting yokes the valve is given a continuous revolution in one direction only. This up and down movement of the wings is accomplished by the supply and exhaust of the gas, the respective diaphragms of opposite chambers being alternately raised and lowered according as gas is supplied to or discharged from the chambers. Thus it will be seen that gas passing through the valve into two of the gas-chambers will cause the diaphragms of the latter to expand and upon coming in contact with the adjacent wings of the valve-operating mechanism will effect the raising or elevation of said wings and the corresponding lowering of their respective co-acting wings, which movement will cause the rotation of the valve and permit gas to pass into the two other chambers simultaneous with the discharge from the chambers first supplied, the gas so supplied passing out into the dome-like cover and thence carried off by a pipe (not shown) secured in opening $i$. The wings are not connected in any manner to the diaphragms or flexible walls, but are so located relatively thereto that the expanded diaphragm will bear directly against the adjacent wing and effect the movement of the latter and the arrangement of the chambers and wings in pairs is such that as one wing of a pair is elevated the other is being lowered consequent upon the alternate supply and exhaust of the opposite chambers. The advantages of this construction, particularly that form having the wings independent of and disconnected from the diaphragms, are obvious to those skilled in the art. The wings are so pivoted and connected together in pairs that their movement by the diaphragm is aided by gravity, since as one wing is being moved upward by its adjacent diaphragm the other is being lowered, the center of gravity of the pivotal connection being passed before the limit of movement in either direction is reached. Thus the wings are continuously in contact with their respective diaphragms and the movements of the latter control the former.

An important advantage resulting from this construction is that it is impossible to surreptitiously effect a reversal of the working of the meter and thereby cause the registering mechanism to work in the reverse direction. Should it be attempted to reverse the passage of the gas through the meter the diaphragms and wings would not operate and hence the valve could not be rotated. Another advantage is that access can be had to the valve and its operating mechanism for the purpose of inspection, cleansing, or the like, simply by removing the cover and without in any way disturbing the diaphragms. Then again it will be seen that owing to the simplicity of construction a great saving in the cost of manufacture is effected and this is a desideratum in this class of inventions; and it will likewise be observed that the wings not being connected to the diaphragms the integrity of the latter is not impaired.

In order to prevent leakage of gas into the recording box, which (especially with natural gas where sulphur is present in a greater or less degree) will cause the discoloring of the glass and dials, we dispense with the ordinary stuffing box and provide the librating shaft E with a flexible diaphragm $i'$ which is held tight against an inner shoulder $i^2$ of a plug $i^3$ by a second smaller plug $i^4$ screwed into said former plug. The diaphragm $i'$ is held between two collars $i^5$, $i^6$, the former being stationary and the latter being held to its place by a nut $i^7$ screwed on shaft E. The outer, larger plug $i^3$ is externally threaded and engages a threaded opening in the cover. The diaphragm is so firmly held in place within the outer plug that gas is prevented from passing into the registering box and at the same time the shaft E is so supported that an easy librating movement is obtained. This construction we have found far superior to the ordinary stuffing-boxes and simpler and less expensive. In lieu of this arrangement that shown in Fig. 7 may be employed, when it is preferable to use a rotary shaft, for instance when the device is employed as a water meter. In this form a series of circular recesses $k$ is formed in the under side of the top of the plug $k'$ and a second series $k^2$ in the opposite face of the flange $k^3$ of rotary shaft $k^4$, and a washer $k^5$ having corresponding recessed surfaces is held between said flange and end of plug. Against the under side of the flange a collar $k^6$, preferably composed of fiber, is held by a coiled spring $k^7$ against which bears the inner plug $k^8$. This construction permits the shaft to freely turn, and at the same time prevents leakage into the registering box.

In Figs. 8 and 9 we have shown a slightly modified form of connection between the valve operating wings, the same comprising two rings L, L', connected at diametrically opposite points to the rigid arms of the wings, and two arms $l$, $l'$, connected at their outer ends to short studs $l^2$ of said rings and having openings at their inner ends through which the cranked portion of the valve rod is passed. By this construction the valve mechanism will operate in substantially the same manner as that first above described.

In lieu of both of the foregoing arrangements that shown in Fig. 10 may be substituted. In this form we employ a librating shaft $L^2$ having a ball $l^3$ which rests in a socket $l^4$ formed in the upper end of a second cage $l^5$ screwed on the tubular portion $C^2$ of the cage C'. The shaft at its lower end extends into a slotted crank-arm $l^6$ of the valve rod. The rigid arms of the pivoted wings are connected by arms or links $l^7$ which radiate from a ring $l^8$ through which the shaft $L^2$ is passed. To guide the movement of these arms a vertical arm $l^9$ is extended up from the lower ring of the cage and its upper forked end $l^{10}$ extends on either side of one of the arms. This serves to guide the movement of all of the arms and wings. The upper ends of the wing arms have balls $l^{12}$ which fit in a socket $l^{13}$ from the sides of which project trunnions $l^{14}$ bearing in corresponding openings in the outer forked ends of the arms $l^7$.

While it is preferred to construct the meter after the forms above outlined whereby the diaphragms and pivoted wings will occupy approximately horizontal positions and have an up and down movement yet we do not restrict ourselves thereto and any arrangement in which the valve-operating mechanism is disconnected from but operated by the inflated diaphragms is clearly within the scope of our invention. Hence the wings and the diaphragms may be arranged to occupy an approximately vertical or upright position and the wings caused to move in and out instead of upward and downward. Such an arrangement is shown in Figs. 13 and 14. In this form the skeleton-like casting M has four removable sides $m$ which hold the diaphragms $m'$ in place, a lower tubular portion $m^2$ of each side being coincident with one of four hollow enlargements or passage-ways $m^3$ which lead from the ports of the inlet valve and valve seat. The wings N are pivoted at one side, preferably by bent rods and eyes $n$, and to the opposite or free side of each wing is connected the outer end of an arm $n'$, said arms at their inner ends having holes through which the vertical portion of the cranked valve-rod is passed. The operation of this form is substantially the same as that before described, two gas chambers being supplied with gas simultaneously with the discharge of the other two chambers, the inflation of the diaphragms causing the latter to bear against and move the pivoted wings inward and outward.

From what has been said it will be seen that we have produced a gas-meter which constitutes a decided advance in the art; that the construction is simple; not liable to readily get out of order; and is inexpensive and durable. It is obvious that changes may be made in the construction of our meter without departing from the scope of the invention and that while we have specified the wings as being disconnected from the diaphragms and stated the resultant advantages thereof, yet, if preferred, said wings may be secured direct to the diaphragms.

We claim as our invention—

1. A meter having a rotary inlet and outlet valve operated by the inflation of one or more flexible walls or diaphragms which are disconnected from said valve or its operating mechanism, and registering mechanism operated by said valve as set forth.

2. A meter having a series of chambers, flexible walls or diaphragms for said chambers, an inlet and outlet valve, and mechanism for operating the same, comprising hinged wings disconnected from but in proximity to said flexible walls or diaphragms, substantially as set forth.

3. A gas-meter having a series of gas-chambers, flexible walls or diaphragms for said chambers, a central inlet and outlet valve controlling the ports to each of said chambers, hinged or pivoted wings adjacent to said diaphragms and connections between said wings and valve, substantially as set forth.

4. A gas-meter having a series of gas-chambers, flexible walls or diaphragms for said chambers, a central inlet and outlet valve controlling the ports to each of said chambers, hinged or pivoted wings adjacent to but disconnected from said diaphragms, and connections between each pair of said wings and said valve, whereby the connected wings have an alternate movement and effect the gradual rotation of said valve, substantially as set forth.

5. A gas-meter having a series of gas receiving chambers, flexible walls or diaphragms covering said chambers, a central valve controlling the supply to some of said chambers simultaneous with the discharge from others of said chambers, means connected to said valve for operating the same said means being disconnected from said diaphragm which when inflated will move said valve, substantially as set forth.

6. A gas-meter having a series of four gas-chambers provided with flexible walls or diaphragms and ports opening thereinto, an inlet valve controlling said ports whereby as two of said chambers are supplied with gas two are free to discharge, and mechanism for rotating said valve having broad or widened wings in proximity to but disconnected from said diaphragms, which latter when inflated will bear against said wings and rotate said valve, substantially as set forth.

7. A gas-meter having a series of horizontal gas-chambers provided with flexible walls or diaphragms, an inlet and outlet valve, and mechanism for operating said valve having approximately horizontal wings capable of being moved up and down over said chambers by the inflation of said diaphragms, as set forth.

8. A gas-meter having a series of horizontal gas-chambers provided with flexible walls or diaphragms, an inlet and outlet valve, pivoted or hinged wings connected in pairs and movable up and down over said chambers, and connections between said wings and said valve, substantially as set forth.

9. A gas-meter having a series of horizontal gas-chambers provided with flexible walls or diaphragms, a valve common to all of said chambers having an upwardly extended cranked rod, a series of approximately horizontal pivoted wings, and rocking or pivotal connections between said wings engaging said cranked-valve-rod, substantially as set forth.

10. A gas-meter having a series of horizontal gas-chambers, a central supply opening and ports leading therefrom into said chambers, a rotary valve located in said opening and having a cranked rod, flexible walls or diaphragms covering said gas-chambers, hinged or pivoted wings located over said diaphragms and having arms projecting therefrom, and yokes connecting the said arms of opposite wings having central openings through which said cranked-rod projects, substantially as set forth.

11. A gas-meter having a series of gas-chambers provided with diaphragms or flexible walls and ports leading into said chambers, a valve seat having ports coincident with said former ports, a rotary valve fitted on said seat, a separable cage therefor engaging said valve seat, a valve-rod engaging said valve, pivoted wings operated by said diaphragms, and yokes connecting said wings in pairs and engaging said valve-rod, substantially as set forth.

12. A gas-meter having a series of horizontal gas-chambers, a central supply opening and ports leading into said chambers, a valve and its seat located in said opening, a rod engaging said valve, a cage supporting said rod, flexible walls or diaphragms over said gas-chambers, a ring holding said diaphragms, hinged or pivoted wings capable of being moved up and down by said diaphragms when inflated and having arms projecting therefrom and independent yokes connecting said arms of opposite wings and engaging said valve-rod at their centers and giving to the latter a rotary movement, substantially as set forth.

13. A gas-meter having a series of four gas-chambers provided with flexible walls or diaphragms and ports opening thereinto, an inlet valve having two sets of ports, one for admitting gas to two of said chambers, and the other for simultaneously exhausting from the other two of said chambers, wings hinged or pivoted adjacent to said diaphragms but not connected thereto, arms extending from said wings, the yokes connected at their ends to said arms of opposite wings, and connections between said yoke and valve, whereby the latter is rotated by the alternate movement of said wings which are operated by the inflation of said diaphragms, substantially as set forth.

14. A gas-meter having gas-chambers provided with flexible walls or diaphragms, an inlet valve controlling the supply and discharge of said chambers and having a cranked rod, a series of pivoted wings operated by said diaphragms, arms extending from said wings, yokes connected at their ends to said arms and having central transverse slots through which said cranked valve-rod projects, substantially as set forth.

15. A gas-meter having a series of gas-chambers, a central supply opening and ports leading into said chambers, a valve seat secured in said opening having ports and a threaded portion, a rotary valve movable on said seat, a cage engaging said threaded portion and having a sleeve or tubular portion, a rod held by said sleeve and engaging said valve at its lower end, hinged or pivoted wings in proximity to said diaphragms, arms projecting from said wings, and yokes connecting said arms of opposite wings and having central openings through which said valve rod is extended, substantially as set forth.

16. A gas-meter having its bottom provided with a central opening, a series of walls forming gas-chambers and ports opening thereinto from said central opening, flexible walls or diaphragms fitted over said chambers, a valve and valve seat having ports, a rod for moving said valve, approximately horizontally disposed wings located over said diaphragms, arms extending from said wings, and yokes connected at their ends to said arms and having engagement with said valve-rod, whereby said wings have an alternate up and down movement and said valve is caused to rotate, substantially as set forth.

17. A gas-meter having its bottom provided with a central opening, a series of walls forming gas-chambers and ports opening into said chambers, diaphragms located over said chambers, a ring having arms secured to said walls for holding said diaphragms in place, an inlet and outlet valve, wings operated by said diaphragms, and connections between said wings and said valve, substantially as set forth.

18. As an improved connection between the registering mechanism and working parts of a meter or the like, a shaft having a rigidly secured horizontal projecting portion a plug or housing having an inner seat and means for holding said horizontal portion against said seat whereby said shaft is free to be operated by said working parts, substantially as set forth.

19. In a meter or the like, having its cover provided with an opening, a plug or housing fitted in said opening, a shaft having a flange, a diaphragm or collar thereon, and a lower plug fitted in said former plug and holding said shaft in place, substantially as set forth.

20. In a meter or the like, having its cover provided with an opening, a plug or housing fitted in said opening having an inner seat, and a librating shaft having a diaphragm held against said inner seat of said plug or housing, whereby said shaft is free to librate and a fluid-tight connection is obtained, substantially as set forth.

21. The combination, with the cover having an opening therein, and a registering mechanism having its operating shaft provided with a slotted arm, of a plug or housing fitted in said opening and having an inner shoulder, a librating shaft having a diaphragm thereon, and a second plug holding said diaphragm against said shoulder, substantially as set forth.

22. In a gas-meter having a valve, mechanism for operating said valve, and registering mechanism, a shaft engaging said registering mechanism and operated by said valve mechanism, a plug or housing through which said shaft is extended, a diaphragm on said shaft, upper and lower collars, and an inner plug holding said diaphragm to its seat, substantially as set forth.

In testimony whereof we have signed this specification in the presence of two subscribing witnesses.

OLIVER C. PUDAN.
LOUIS B. FULTON.

Witnesses:
M. B. CHAPLIN,
C. W. TOWNSEND.